J. P. ABBOTT.
Adjustable Stove-Pipe.
No. 216,991. Patented July 1, 1879.
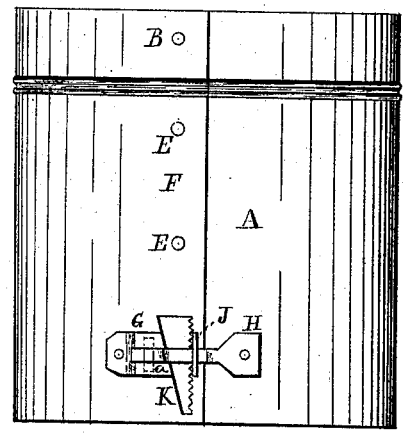
Fig. 1.
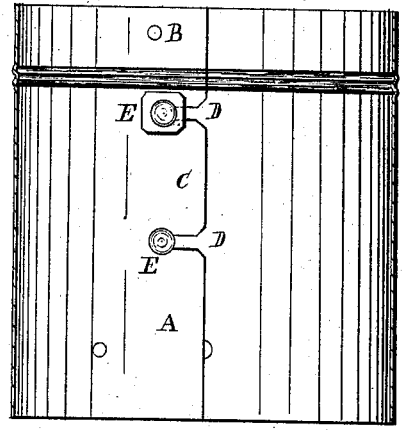
Fig. 2.
Fig. 3. 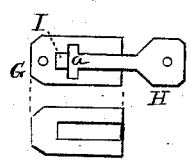 Fig. 4. 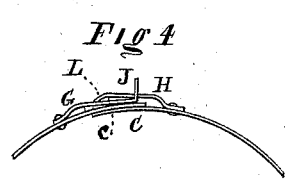 Fig. 5. 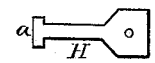
Witnesses.
T. J. Boerken
Charles Leavitt
Inventor.
J. P. Abbott
By Burridge & Co.
Attys.

UNITED STATES PATENT OFFICE.

JONATHAN P. ABBOTT, OF CLEVELAND, OHIO.

IMPROVEMENT IN ADJUSTABLE STOVE-PIPES.

Specification forming part of Letters Patent No. 216,991, dated July 1, 1879; application filed October 28, 1878.

*To all whom it may concern:*

Be it known that I, JONATHAN P. ABBOTT, of Cleveland, in the county of Cuyahoga and State of Ohio, have invented a certain new and Improved Adjustable Stove-Pipe; and I do hereby declare that the following is a full, clear, and complete description of the same.

The nature of my invention relates to combining certain devices with an adjustable stove and furnace pipe, whereby one section of the pipe can be readily fitted to another section of different size, by means of which sections of one size may be easily connected with sections either larger or smaller.

I am aware that adjustable stove-pipes have been known and used whereby sections differing in size may be connected together; hence I do not claim, broadly, adjustable or expansive stove-pipes; and I am aware that adjustable stove-pipes have been made with a folded and plain edge, lapped one over the other, and held in place by screw-clamps; but what distinguishes my improvement is having the pipe lapped and so riveted at one end as to form a joint, so that the opposite end may be expanded or contracted, and having one or more slots on the end of one lap and rivets or studs attached to the other lap and extending into the said slots, which will hold the laps together and allow the pipe to expand and contract. It also relates to a certain arrangement of devices secured to the outside of the pipe on each side of the lap, which, in connection with a wedge or key, securely holds the pipes in place where connected together.

For a more complete description of said invention reference will be had to the following specification and to the annexed drawings, in which—

Figure 1 is an outside view of the pipe; Fig. 2, a vertical section, showing the interior. Figs. 3, 4, and 5 are detached sections, which will be referred to hereinafter.

Like letters of reference refer to like parts in the several views.

In this improvement the laps of the pipe A are riveted together at one end, as seen at B, Figs. 1 and 2, in such way as to allow the opposite end of the pipe to expand and contract its diameter, according to the size of the pipe to which it is to be connected. The inside lap, C, is provided with one or more slots, D, which slots receive the shanks of the rivets E, secured to the outside lap, F, as seen in Fig. 1. The heads of the rivets extend over the slots onto the lap part of the pipe, as shown in Fig. 2. These rivets fit loosely to the inside lap, for the purpose of allowing the pipe to expand and contract, for the purpose set forth; hence, by means of the slots, rivets, shanks, and heads, the pipe is prevented from springing or bending out of shape while being adjusted to a connecting section. By this means, also, the pipe retains its uniform shape while being adjusted to pipes of different sizes.

To the outside of the pipe, near the lap-joint, is riveted a loop, G, Figs. 1 and 3, and on the opposite side of the joint is fastened a tongue, H, Figs. 1 and 4. This tongue is provided with a T end, *a*, as seen in Fig. 5. This tongue extends into the slot I of the loop, and the T end *a* laps over onto the under side of the loop, as shown in Figs. 1, 3, and 4. The T end *a* of the tongue prevents the tongue from springing up out of the loop G, in connection with the bar J, on the under side of which the tongue passes. In said bar is a hole, through which loosely passes the tongue H, which, beyond the key K, is bent or turned down, extending under the loop G, with the end *a* at right angles to the slot in the said loop, as seen in Figs. 1 and 3. This bar J is turned outward a short distance in an angular relation to allow the tongue to extend into and through the opening in the bar J, so as to form a space, *c*, between the tongue and loop, as seen in Fig. 4, for the admission of the key or wedge K, Fig. 1. By means of this key pressing against the bar J on one side and the bent end L of the tongue on the other the laps are drawn together, contracting the diameter of the pipe, causing it to fit tightly on the adjoining pipe with which it may be connected.

By forcing the key into the space between the parts J and the bent end of the tongue the diameter of the pipe may be more or less contracted, according to the width of the key, which key, having a serrated edge, prevents its withdrawal after being forced into the space *c* to connect the pipe with another.

What I claim as my invention, and desire to secure by Letters Patent, is—

1. In adjustable stove-pipes, the ends thereof lapped onto each other, and having one or more slots, D, in one lap and one or more rivets, E, in the other, said rivets fitting loosely in said slots, in combination with the tongue H, secured to the pipe on one side of the lap, and the loop G upon the other, and key K, arranged substantially as described, and for the purpose specified.

2. In adjustable stove-pipes, an improvement consisting of the laps riveted together at one end of the pipe in such way as to allow the opposite end to expand and contract, and having attached to the pipe on the side of the lap-joint the tongue H, and on the other side of said joint the loop G, arranged to receive the key K, substantially in the manner as and for the purpose herein set forth.

3. In combination with adjustable stove-pipes, the loops G, tongue H, and key K, constructed and arranged substantially as described, and for the purpose set forth.

JONATHAN P. ABBOTT.

Witnesses:
T. J. JORCKEN,
CHARLES LEAVITT.